United States Patent
Johansen et al.

(10) Patent No.: US 10,570,802 B2
(45) Date of Patent: Feb. 25, 2020

(54) SYSTEM FOR THE REMOVAL OF PARTICULATE MATTER AND NOXIOUS COMPOUNDS FROM ENGINE EXHAUST GAS

(71) Applicant: UMICORE AG & CO. KG, Hanau-Wolfgang (DE)

(72) Inventors: Keld Johansen, Frederikssund (DK); Ton V. W. Janssens, Bagsvaerd (DK)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 16/548,261

(22) Filed: Aug. 22, 2019

(65) Prior Publication Data

US 2019/0376435 A1   Dec. 12, 2019

Related U.S. Application Data

(63) Continuation of application No. 15/741,610, filed as application No. PCT/EP2016/065951 on Jul. 6, 2016, now Pat. No. 10,443,478.

(30) Foreign Application Priority Data

Jul. 9, 2015   (DK) ................................ 2015 00403

(51) Int. Cl.
| | | |
|---|---|---|
| *F01N 13/00* | (2010.01) | |
| *F01N 3/035* | (2006.01) | |
| *B01D 53/94* | (2006.01) | |
| *B01J 23/30* | (2006.01) | |
| *B01J 23/42* | (2006.01) | |
| *B01J 35/04* | (2006.01) | |
| *F01N 3/20* | (2006.01) | |
| *F01N 3/28* | (2006.01) | |
| *F01N 3/10* | (2006.01) | |

(52) U.S. Cl.
CPC ......... *F01N 13/009* (2014.06); *B01D 53/945* (2013.01); *B01D 53/9418* (2013.01); *B01D 53/9436* (2013.01); *B01J 23/30* (2013.01); *B01J 23/42* (2013.01); *B01J 35/04* (2013.01); *F01N 3/035* (2013.01); *F01N 3/101* (2013.01); *F01N 3/208* (2013.01); *F01N 3/2842* (2013.01); *F01N 13/0093* (2014.06); *B01D 2255/1021* (2013.01); *B01D 2255/20707* (2013.01); *B01D 2255/20723* (2013.01); *B01D 2255/20776* (2013.01); *B01D 2255/30* (2013.01); *B01D 2255/9022* (2013.01); *F01N 2510/06* (2013.01); *F01N 2610/02* (2013.01)

(58) Field of Classification Search
CPC ...... F01N 3/035; F01N 3/101; F01N 13/0093; F01N 13/009; F01N 2610/02
USPC ................................................... 422/168, 171
See application file for complete search history.

(56) References Cited

U.S. PATENT DOCUMENTS

| | | |
|---|---|---|
| 8,635,855 B2 | 1/2014 | Mital et al. |
| 8,904,760 B2 | 12/2014 | Mital et al. |
| 2002/0044897 A1 | 4/2002 | Kakwani et al. |
| 2004/0098971 A1 | 5/2004 | Upadhyay et al. |
| 2006/0130461 A1 | 6/2006 | Gabrielsson |
| 2006/0275192 A1 | 12/2006 | Gabrielsson et al. |
| 2008/0116054 A1 | 5/2008 | Leach et al. |
| 2009/0193796 A1 | 8/2009 | Wei et al. |
| 2009/0196812 A1* | 8/2009 | Bull .............. B01D 53/9418 423/239.1 |
| 2010/0077739 A1 | 4/2010 | Rodman et al. |
| 2010/0199839 A1 | 8/2010 | Zhang et al. |
| 2011/0030346 A1 | 2/2011 | Neubauer et al. |
| 2012/0328499 A1 | 12/2012 | Ando et al. |
| 2013/0095013 A1 | 4/2013 | Banno et al. |
| 2014/0050627 A1* | 2/2014 | Mende .............. B01D 53/944 422/171 |
| 2014/0093442 A1 | 4/2014 | Spreitzer et al. |
| 2014/0230433 A1 | 8/2014 | Yacoub |
| 2015/0217230 A1 | 8/2015 | Reichert et al. |
| 2015/0231564 A1 | 8/2015 | Wittrock et al. |
| 2016/0346733 A1 | 12/2016 | Gabrielsson |
| 2017/0182447 A1* | 6/2017 | Sappok ............ B01D 46/0086 |
| 2018/0111088 A1* | 4/2018 | Li ................... B01D 53/9418 |
| 2018/0111089 A1* | 4/2018 | Li ................... B01D 53/9418 |
| 2018/0156090 A1* | 6/2018 | Xue ................ F01N 13/009 |
| 2018/0169581 A1 | 6/2018 | Gabrielsson |

FOREIGN PATENT DOCUMENTS

| | | |
|---|---|---|
| EP | 2 520 354 A1 | 11/2012 |
| EP | 2 535 102 A | 12/2012 |
| WO | 2012/166833 A1 | 12/2012 |

OTHER PUBLICATIONS

International Search Report for PCT/EP2016/065951 dated Sep. 29, 2016 in English Language.

\* cited by examiner

*Primary Examiner* — Tom P Duong
(74) *Attorney, Agent, or Firm* — Smith, Gambrell & Russell, LLP

(57) ABSTRACT

System for the removal of noxious compounds and particulate matter from exhaust gas of a compression ignition engine comprising a three way catalyst unit having an $NH_3$-SCR activity, an ammonia oxidation activity and an adsorption activity of volatile vanadium and tungsten compounds volatilized off an upstream SCR active catalyst.

14 Claims, 1 Drawing Sheet

Figure 1:
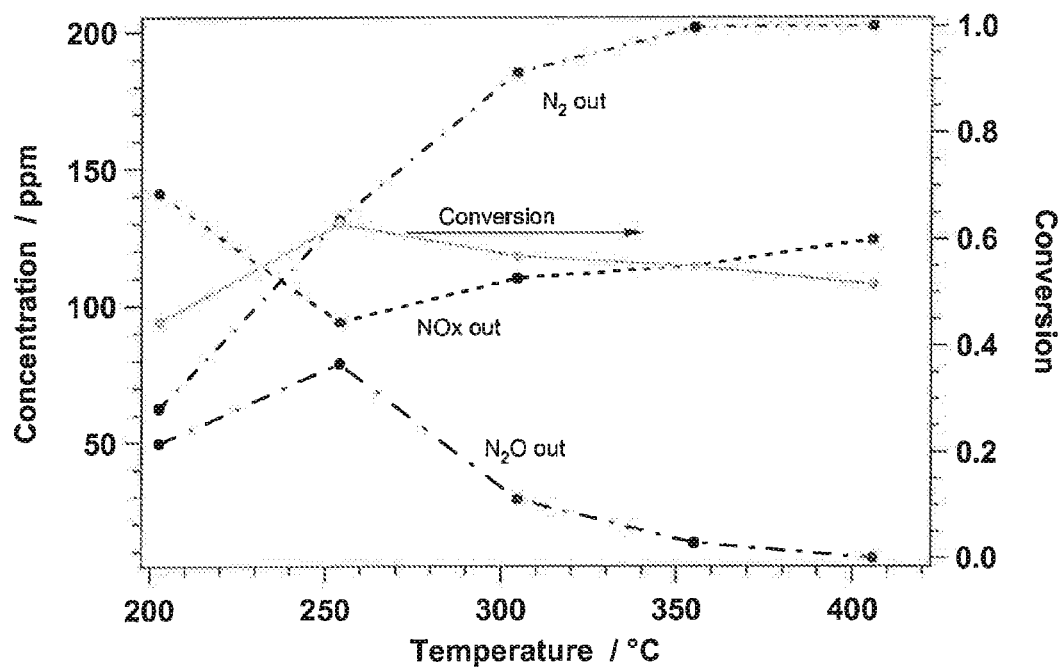

SYSTEM FOR THE REMOVAL OF PARTICULATE MATTER AND NOXIOUS COMPOUNDS FROM ENGINE EXHAUST GAS

The present invention relates to a system for the removal of volatile organic compounds, particulate matter and nitrogen oxides (NOx) from exhaust gas of a compression ignition engine.

The exhaust system of modern vehicles with lean burning engines is typically equipped with an oxidation catalyst, a particulate filter and a catalyst for the selective reduction of NOx (SCR) in presence of a reduction agent.

Oxidation catalysts being active in the oxidation of volatile organic compounds and carbon monoxide and SCR catalysts are known in the art and disclosed in numerous publications.

Typically employed particulate filters (DPF) in diesel exhaust gas cleaning systems, are wall flow filters with a plurality if inlet and outlet channels. The inlet channels are closed at their outlet side and the outlet channels are closed at their inlet side, so that the gas flowing into the filter is forced through porous walls defining the channels, whereby particulate matter is filtered off the gas.

To meet future emission regulations for diesel passenger cars and trucks requires usage of both diesel particulate filter (DPPF) technology and NOx reduction catalyst. Due to its potential for fuel optimization and high efficiency in NOx removal, selective catalytic reduction using ammonia as a reductant (NH3-SCR) is presently the preferred technology for NOx reduction.

The SCR catalyst can be arranged as a separate unit upstream and/or downstream the DPF. It has also been suggested in the art providing the DPF with an SCR catalyst to obtain more compact cleaning systems.

Catalysts for use in ammonia SCR are well known in the art. Of those, catalysts based on $V_2O_5$ and $WO_3$ supported on a $TiO_2$ carrier provide a fundamental solution to effectively reduce NOx emissions from Diesel fueled vehicles by means of the Selective Catalytic Reduction (SCR) with ammonia. Compared to alternative strategies for NOx emission control like exhaust gas recirculation (EGR) and zeolite-based catalysts, a great advantage of vanadium-based SCR catalysts is their SCR efficiency, robustness to sulfur and their price.

When operating a cleaning system with a DPF, particulate matter trapped in the filter must be form time to time or continuously be removed in order to avoid pressure drop over the filter. An increased pressure drop costs fuel penalty. Therefore, particulate matter accumulated on the filter walls at inlet side of the filter must be removed either by active regeneration, wherein particulate matter is catalytically burned off in contact with an oxidation catalyst supported on the filter walls in combination with oxygen in exhaust gas at increased exhaust gas temperatures or by non-catalytic passive regeneration.

In the passive soot regeneration the DPF is regenerated at temperatures below 550° C. with $NO_2$ that is generated over the upstream DOC by oxidation of NO. Regeneration with oxygen in the exhaust gas should be avoided in order to control the temperature below 550° C. If the filter uncontrolled regenerates with oxygen the temperature could rise above 550° C.

Despite being effective SCR catalysts, vanadium oxide based catalysts contain $V_2O_5$ as an essential component, which is toxic. Reports in the literature suggest that bulk $V_2O_5$ has a significant vapor pressure at temperatures relevant to the catalyst operation, and both V and W compounds react with water to form species with increased vapor pressure.

Measurable amounts of vanadium are first released at temperatures of above 600° C., which is around the highest applicable working temperature of these systems.

Consequently, there is a risk of V and W volatile compounds can vaporize from the $V_2O_5/WO/TiO_2$ SCR catalysts in particular when integrated in the DPF. The temperature in V-SCR catalysed DPF has the highest probability of being exposed to temperatures exceeding 600° C., but in severe events the temperature in the V-SCR catalyst can also increase above 600° C. and trigger evaporation of these compounds.

Beside the risk of emission of vanadium and tungsten compounds into the atmosphere, ammonia slip from the SCR reaction has also to be considered. To obtain a maximum NOx conversion, ammonia is typically added to the exhaust gas in over stoichiometric amounts and unreacted ammonia is emitted to the atmosphere.

The present invention seeks to solve the above problems caused by employing vanadium and tungsten oxides as effective ammonia SCR catalyst and over stoichiometric amounts of ammonia reductant in the SCR reaction in a system for the removal of particulate matter and noxious compounds including nitrogen oxides from an engine exhaust gas by combining a vanadium and tungsten adsorbent with an ammonia oxidation catalyst.

Thus, the present invention is in its broadest aspect a system for the removal of volatile organic compounds, particulate matter and nitrogen oxides from exhaust gas of a compression ignition engine comprising (a) an oxidation unit with a catalyst active in oxidation of volatile organic compounds and carbon monoxide to carbon dioxide and water and nitrogen oxide to nitrogen dioxide;

(b) means for introducing a urea solution into the exhaust gas from unit (a);

(c) a downstream catalysed wall flow particulate filter consisting of a plurality of longitudinal inlet flow channels and outlet flow channels separated by gas permeable porous partition walls, each inlet flow channel having an open inlet end and a closed outlet end, and each outlet flow channel having a closed inlet end and an open outlet end, the wall flow filter is catalysed with an $NH_3$-SCR active catalyst comprising oxides of vanadium and tungsten arranged within the gas permeable porous partition walls and/or on the plurality of the inlet and/or outlet channels of the wall flow particulate filter;

(d) a downstream three way catalyst unit having an $NH_3$-SCR activity, an ammonia oxidation activity and an adsorption capacity for volatile vanadium and tungsten compounds volatilized off the SCR active catalyst of the particulate filter (c), the three way catalyst comprising high surface compounds selected from high surface metal oxides, zeolites, silica, non-zeolite silica alumina, and mixtures thereof.

Several oxides have the property to adsorb evaporated compounds of vanadium and tungsten. Oxides of vanadium, tungsten and titanium admixed with at least one of a high surface ceria, alumina, silica, zirconia, non-zeolite silica alumina and zeolites, have shown as useful V and W compounds adsorbent and are at the same time active in the SCR reaction. These adsorbents are preferably combined with an ammonia slip catalyst (ASC).

Typical ASC formulations consist of an ammonia oxidation function based on platinum, optionally combined with palladium on an alumina or titania carrier and an SCR active catalyst. In preferred formulations for use in the invention the V,W adsorbent is applied together with an SCR catalyst as a top layer on a bottom layer with the ammonia oxidation catalyst. Both layers can contain binding phases of oxide ceramics as alumina, titania, silica-alumina that have V,W adsorbing capacity.

In a specific embodiment of the invention, the three way catalyst comprises a bottom layer comprising platinum, alumina and/or titania and optionally palladium, coated on a substrate or partly or entirely forming the substrate, a top layer comprising oxides of vanadium, tungsten and titanium admixed with at least one of a high surface ceria, alumina, silica, zirconia, non-zeolite silica alumina and zeolite.

As the three way catalyst is arranged at the coldest position in the exhaust system any potentially evaporated V and W compounds will be trapped on the three way catalyst during the life time of the exhaust system on a vehicle.

High vanadium and tungsten adsorption efficiencies are achieved with a relatively thick top layer in the three way catalyst.

Thus, in preferred embodiments the top layer has layer thickness of between 40 µm and 250 µm.

In further a preferred embodiment the bottom layer has a layer thickness of between 5 µm and 80 µm. When the bottom layer itself forms partly or entirely the substrate the layer thickness is up to 450 µm.

In order to assure sufficient permeation of ammonia from the top layer to the bottom layer, the top layer must be relatively porous.

Thus, in further a preferred embodiment the top layer has a porosity of between 20% and 80%.

Preferably the three way catalyst is arranged on a substrate with a flow through monolith shape.

When coated on a substrate in form of a flow through monolith, the amount of the top layer in the three way catalyst is between 50 and 500 g per liter of the flow through monolith.

The amount of the bottom layer in the three way catalyst is preferably between 5 and 255 g per liter of the flow through monolith, the amount depends on whether the bottom layer is coated on the surface of the monolith substrate or partly or entirely forms the monolith substrate.

High ammonia oxidation activities of the three way catalyst are obtained, when the bottom layer of the three way catalyst contains 0.0018 g-0.35 g platinum and/or palladium per liter of the flow through monolith.

The top layer of the three way catalyst comprises preferably per liter of the flow through monolith 1.0 g-20 g vanadium pentoxide, 3 g-40 g tungsten oxide, 40 g-460 g titania, and 0 g-86 g silica, 0 g-86 g ceria, 0 g-86 g alumina, 0 g-86 g non-zeolite silica alumina and 0 g-86 g of a zeolite.

Hereby it is ensured that volatile vanadium and tungsten compounds are essentially adsorbed on the surface of titania and silica and that remaining amounts of NOx from the upstream units are selectively reduced to nitrogen and water by the SCR reaction.

In the above embodiments of the invention it is preferred that the oxidation catalyst in unit (a) upstream of the DPF comprises platinum and palladium supported on silica-alumina and/or alumina and/or titania with a weight ratio of platinum to palladium of 1:0 to 1:1.

The content of platinum and/or palladium in the oxidation catalyst is preferably 0.1 g and 2 g per liter catalyst.

In still an embodiment, it may be preferred that the system comprises a further SCR catalyst unit for decreasing remaining amounts of NOx in the exhaust gas from filter (c) by reaction with ammonia in contact with an SCR active catalyst comprising oxides of vanadium, tungsten and titanium, the catalyst arranged between filter (c) and three way catalyst (d).

FIG. 1 displays the NOx conversion, together with the outlet concentrations of NOx, $N_2O$, and $N_2$. The performance under these conditions in $NH_3$-SCR is documented by a conversion of about 50-60% in the temperature range of interest (250-400° C.) with a low yield of $N_2O$ and a high yield of $N_2$. FIG. 3 shows NOx conversion for $NH_3$-SCR and outlet concentrations of NOx, N2, and N2O for a Pt/V—W-oxide based monolith three way catalyst, using a feed of 250 ppm NOx, 300 ppm NH3, 12% O2, and 4% water in nitrogen at a space velocity of 100000 $h^{-1}$.

Figure 2:
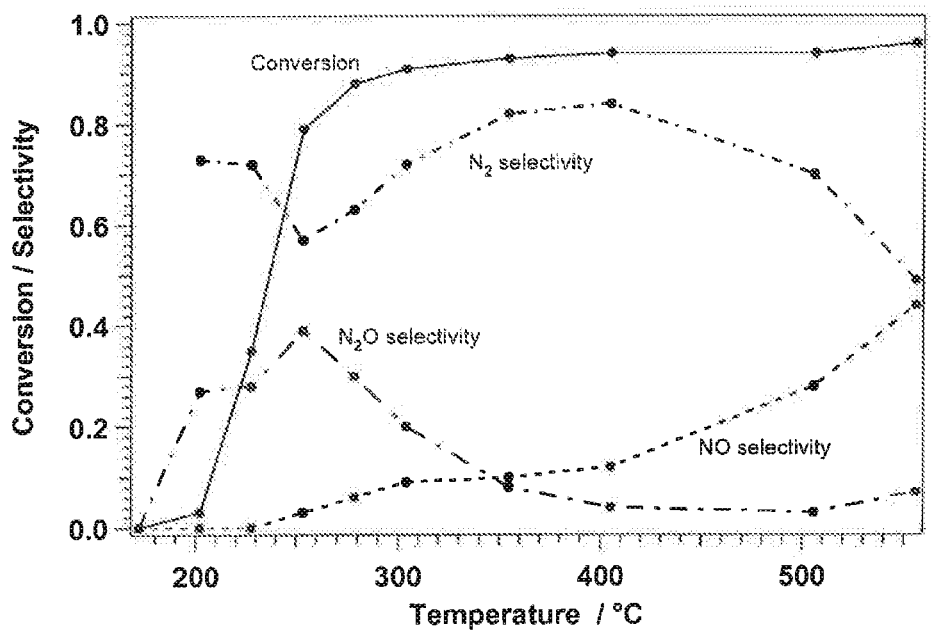

FIG. 2 shows the conversion of ammonia, and selectivities to N2, NOx, N2O in the selective oxidation to ammonia. In the temperature range of interest (250-400 □C), the ammonia is almost completely converted and the reaction product consists mainly of nitrogen. FIG. 2 stows $NH_3$ conversion for selective oxidation of ammonia and selectivities to NOx, $N_2$, and $N_2O$ for a Pt/V—W-oxide based monolith three way catalyst, using a feed of 200 ppm $NH_3$, 12% $O_2$, and 4% water in nitrogen at a space velocity of 100000 $h^{-1}$.

EXAMPLE 1

This example demonstrates the performance in $NH_3$-SCR of a three way catalyst. The catalyst consists of Pt impregnated on a glass fiber paper based monolith that is reinforced with $TiO_2$, on top of which a washcoat layer, containing vanadium and tungsten, titanium dioxide and silica, having $NH_3$-SCR activity, is applied. The Pt content in the catalyst was 88 mg/l. The content of the SCR active washcoat layer was 197 g/l, of which 5% was silica. The catalyst was degreened at 550° C. for 1 hour prior to the performance test. The reactor feed gas consisted of 250 ppm NOx, of which less than 5% is present as $NO_2$, 300 ppm $NH_3$, 12% $O_2$, and 4% water in nitrogen. The flow rate was adjusted to reach a Space Velocity of 100000 $h^{-1}$, based on the Monolith volume.

EXAMPLE 2

This Example Shows the Performance of the Three Way Catalyst, as characterized in Example 1, for selective oxidation of ammonia to reduce ammonia slip. The catalyst was degreened for 1 h at 550 □C. The feed gas used in this measurement was 200 ppm NH3, 12% O2 and 4% water in nitrogen. The flow was adjusted to reach a space velocity of 100000 h−1 based on the monolith volume.

The invention claimed is:
1. A system for the removal of volatile organic compounds, particulate matter and nitrogen oxides from exhaust gas of a compression ignition engine comprising
    an oxidation unit with a catalyst active in oxidation of volatile organic compounds and carbon monoxide to carbon dioxide and water, and nitrogen oxide to nitrogen dioxide; and
    a catalysed wall flow particulate filter downstream of the oxidation unit, the catalysed wall flow particulate filter comprising a plurality of longitudinal inlet flow channels and outlet flow channels separated by gas permeable porous partition walls, each inlet flow channel having an open inlet end and a closed outlet end, and each outlet flow channel having a closed inlet end and an open outlet end;

wherein the system is adapted for the introduction of a urea solution into the exhaust gas downstream from the catalysed wall flow particulate filter;

wherein the system further comprises an SCR active catalyst downstream of the catalysed wall flow particulate filter to receive exhaust gas into which urea solution has been introduced, the SCR active catalyst comprising oxides of vanadium and tungsten;

wherein the system further comprises a three way catalyst unit downstream of the SCR active catalyst, the three way catalyst unit having an $NH_3$-SCR activity, an ammonia oxidation activity, and an adsorption capacity for volatile vanadium and tungsten compounds volatilized off the SCR active catalyst, the three way catalyst unit comprising compounds selected from the group consisting of metal oxides, zeolites, silica, non-zeolite silica alumina, and mixtures thereof.

2. The system of claim 1 further comprising a second SCR active catalyst comprising oxides of vanadium, tungsten, and titanium, the second SCR catalyst being arranged between the catalyzed wall flow particulate filter and the three way catalyst unit.

3. The system according to claim 1, wherein the three way catalyst unit comprises a bottom layer comprising platinum, alumina, and/or titania, and optionally palladium coated on a substrate, and a top layer comprising oxides of vanadium, tungsten, and titanium admixed with at least one of ceria, alumina, silica, zirconia, non-zeolite silica alumina, and zeolite.

4. The system according to claim 3, wherein the top layer has layer thickness of between 40 μm and 250 μm.

5. The system according to claim 3, wherein the bottom layer has a layer thickness of between 5 μm and 450 μm.

6. The system according to claim 3, wherein the top layer has a porosity of between 20% and 80%.

7. The system according to claim 3, wherein the bottom layer of the three way catalyst unit contains 0.0018 g-0.35 g platinum and/or palladium per liter of the substrate.

8. The system according to claim 3, wherein top layer of the three way catalyst unit comprises, per liter of the substrate, 1.0 g-20 g vanadium pentoxide, 3 g-40 g tungsten oxide, 40 g-460 g titania, 0 g-86 g silica, 0 g-86 g ceria, 0 g-86 g alumina, 0 g-86 g non-zeolite silica alumina, and 0 g-86 g of a zeolite.

9. The system according to claim 1, wherein the three way catalyst unit comprises a substrate with a flow through monolith shape.

10. The system according to claim 9, wherein the amount of the top layer in the three way catalyst unit is between 50 to 500 g per liter of the substrate.

11. The system according to claim 9, wherein the amount of the bottom layer in the three way catalyst unit is between 5 and 255 g per liter of the substrate.

12. The system according to claim 1, wherein the SCR active catalyst further comprises titania.

13. The system according to claim 1, wherein the catalyst in oxidation unit comprises platinum and/or palladium supported on silica-alumina and/or alumina and/or titania with a weight ratio of platinum to palladium of 1:0 to 1:1.

14. The system according to claim 13, wherein the content of platinum and/or palladium is between 0.1 g and 2 g per liter of the catalyst.

* * * * *